(12) United States Patent
Levin et al.

(10) Patent No.: US 12,309,007 B2
(45) Date of Patent: May 20, 2025

(54) ANALOG EQUALIZATION WITH PEAKING AND SLOPE CONTROL

(71) Applicant: Intel Corporation, Santa Clara, CA (US)

(72) Inventors: Itamar Levin, Holon (IL); Tali Warshavsky Grafi, Ramat Gan (IL); Marco Cusmai, Tel Aviv (IL); Ajay Balankutty, Hillsboro, OR (US); Shiva Kiran, Beaverton, OR (US); Ariel Cohen, Modiin-Maccabim-Reut (IL)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 17/127,853

(22) Filed: Dec. 18, 2020

(65) Prior Publication Data

US 2021/0152404 A1    May 20, 2021

(51) Int. Cl.
*H04L 25/03*    (2006.01)

(52) U.S. Cl.
CPC .............................. *H04L 25/03878* (2013.01)

(58) Field of Classification Search
CPC ....... H03L 7/0807; H03L 7/091; H03L 7/087; H03L 7/093; H03L 7/099; H03L 7/0814; H03L 7/00; H03L 7/07; H03L 7/0891; H04L 25/03057; H04L 25/03885; H04L 25/03878; H04L 25/0272; H04L 7/033; H04L 7/0087; H04L 27/01; H04L 25/03146; H04B 1/16; H04B 1/40; H04B 1/123; H04B 1/18; H04B 10/6971; H04B 3/04; H04B 1/12; H04B 10/541; H04B 3/462

See application file for complete search history.

(56) References Cited

U.S. PATENT DOCUMENTS

| | | | | |
|---|---|---|---|---|
| 9,461,851 | B1 * | 10/2016 | Liao | H04L 25/03885 |
| 10,560,291 | B2 | 2/2020 | Lee et al. | |
| 10,924,307 | B1 * | 2/2021 | Zhang | H04L 25/03133 |
| 10,972,249 | B1 * | 4/2021 | Graumann | H04L 25/03878 |
| 10,992,277 | B1 * | 4/2021 | Sun | H03G 3/3036 |
| 11,296,667 | B1 * | 4/2022 | Delshadpour | H03F 1/3211 |
| 11,489,705 | B1 * | 11/2022 | Casey | H04L 25/03038 |
| 2012/0121004 | A1 | 5/2012 | Chang | |
| 2017/0054426 | A1 | 2/2017 | Buer et al. | |
| 2017/0222848 | A1 * | 8/2017 | Sun | H04L 25/03273 |

(Continued)

FOREIGN PATENT DOCUMENTS

| | | |
|---|---|---|
| KR | 101603144 B1 | 3/2016 |
| KR | 101775834 B1 | 9/2017 |

OTHER PUBLICATIONS

Krupnik, Yoel et al., "112-Gb/s PAM4 ADC-Based SERDES Receiver with Resonant AFE for Long-Reach Channels," IEEE Journal of Solid-State Circuits, vol. 55, No. 4, Apr. 2020 (9 pages).

(Continued)

*Primary Examiner* — Eva Y Puente
(74) *Attorney, Agent, or Firm* — Alliance IP, LLC

(57) ABSTRACT

An apparatus comprising at least one medium to transport a signal and an analog equalization circuit to perform equalization on the signal, wherein the analog equalization circuit comprises independently tunable parameters including a peak frequency gain and a mid-range frequency response slope.

18 Claims, 11 Drawing Sheets

(56) References Cited

U.S. PATENT DOCUMENTS

| | | | |
|---|---|---|---|
| 2018/0351524 A1 | 12/2018 | Nagulapalli et al. | |
| 2019/0280906 A1* | 9/2019 | Taylor | H04L 25/03885 |
| 2019/0379340 A1* | 12/2019 | Rattan | H03G 3/3026 |
| 2020/0252248 A1* | 8/2020 | Palusa | H04L 25/14 |
| 2021/0152404 A1 | 5/2021 | Levin et al. | |
| 2021/0288843 A1* | 9/2021 | Yun | G11C 11/4093 |

OTHER PUBLICATIONS

PCT International Search Report and Written Opinion issued in PCT/US2021/049897, dated Dec. 29, 2021; 12 pages.
EESR Notice of Extended European Search Report issued in EP Patent Application No. 21907371.5 issued on Oct. 14, 2024 (10 pages).

* cited by examiner

ANALOG EQUALIZATION WITH PEAKING AND SLOPE CONTROL

BACKGROUND

In modern high speed input/output (I/O) receivers, various types of equalization may be utilized in order to equalize the frequency response of a channel between a transmitter and a receiver. Continuous Time Linear Equalization (CTLE) is one of the most commonly used equalization techniques. An equalizer utilizing CTLE generally resides in the front end of the receiver. A CTLE equalizer may be an analog high-pass filter that counteracts the channel's high-frequency attenuation.

BRIEF DESCRIPTION OF THE DRAWINGS

Like reference numbers and designations in the various drawings indicate like elements.

DETAILED DESCRIPTION

Data transferred from a transmitter across a channel to a receiver (e.g., in a serializer/deserializer (SERDES) communication system) may be distorted based on the channel's frequency response. Various equalization techniques may be used to mitigate such distortion. For example, a continuous time linear equalizer implemented at a front end of the receiver may be used to amplify or attenuate various frequencies of the signal in order to counteract the effects of the signal passing through the channel. In at least some communication systems, the highest frequency that needs to be treated is the signal's Nyquist rate, which is usually severely attenuated by the channel. Therefore, in some implementations, the CTLE may amplify (or at least avoid attenuation of) signals at this rate in order to equalize the channel.

Figure 1:
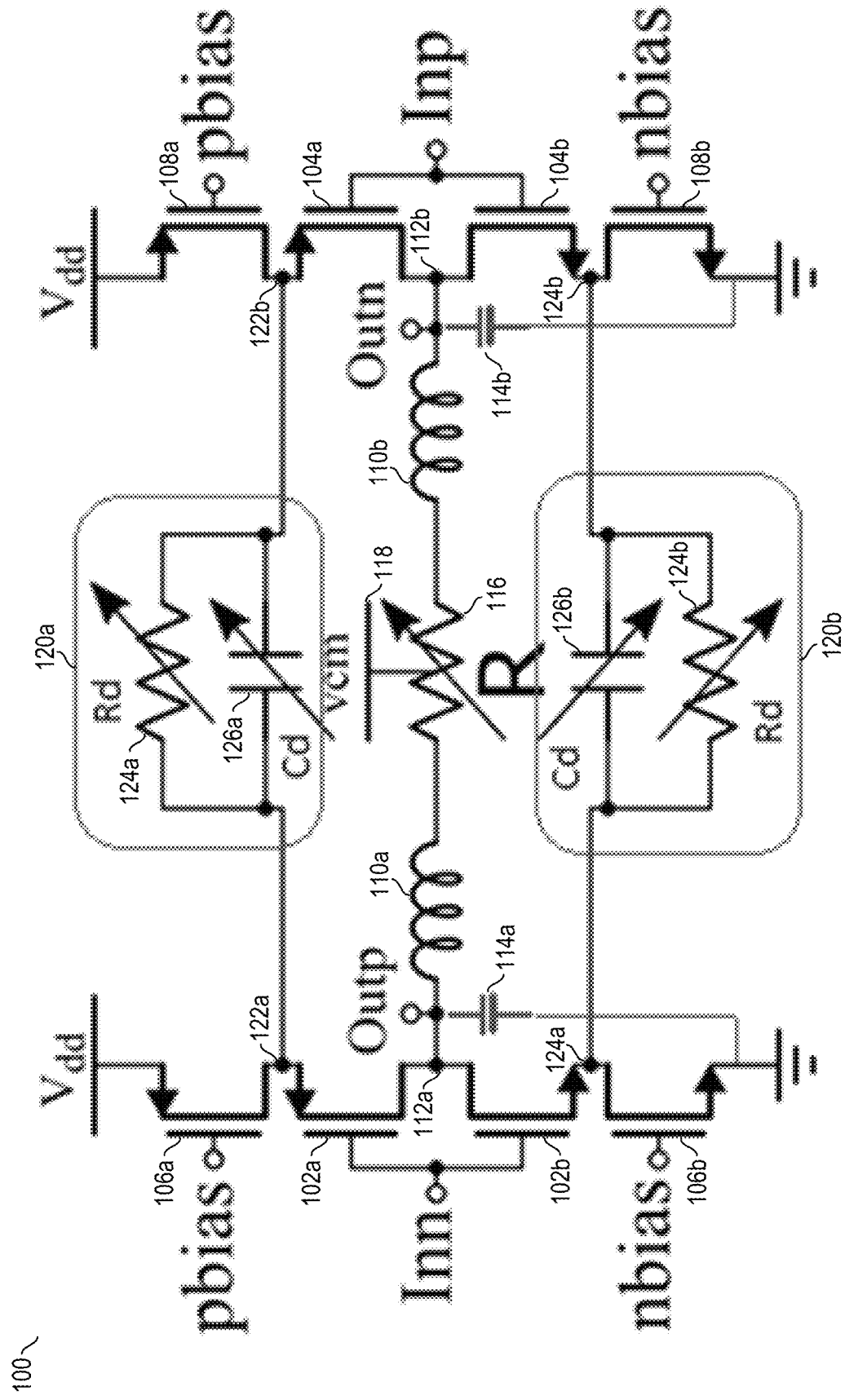
FIG. 1 illustrates a hybrid continuous time linear equalization (CTLE) circuit with peaking and slope control in accordance with certain embodiments.

FIG. 1 illustrates a hybrid continuous time linear equalization (CTLE) circuit 100 with peaking and slope control in accordance with certain embodiments. Circuit 100 combines features of a source-degeneration CTLE (an example of which is described below in connection with 202 of FIG. 2) and a Q-shaping CTLE (an example of which is described below in connection with 204 of FIG. 2) in a single stage to provide a versatile equalization circuit that may provide independent control over peak frequency (also referred to herein as resonant frequency) selection, peak frequency gain, low-frequency de-emphasis amount, and mid-range frequency slope shape. A single hybrid stage may also support a larger equalization range than a single stage of other equalization architectures. Thus, the tunability of circuit 100 (or variants thereof) may provide effective equalization for various different channel types and signaling scenarios. Various embodiments may allow for different slopes at different frequencies while providing tunable high frequency emphasis and low frequency de-emphasis based on the particular channel characteristics.

FIG. 1 depicts a high level circuit diagram of the hybrid CTLE stage, which provides various components and benefits of both source-degeneration and Q-shaping equalizers in a single equalization stage. Circuit 100 includes a differential amplifier, which includes two transconductors (transistor stacks in the embodiment depicted) respectively connected to negative (Inn) and positive (Inp) inputs via respective mediums (where a medium may comprise any suitable material (or combination of materials) to communicate a signal, including but not limited to conductive materials such as metals), where one transconductor includes transistor 102a and 102b and the other transconductor includes transistor 104a and 104b. In some embodiments, each transconductor includes a pair of metal oxide semiconductor field effect transistors (MOSFETs) comprising a positive-type (p-type) metal oxide semiconductor transistor (PMOS) (e.g., 102a or 104a) and a negative-type (n-type) MOS transistor (NMOS) (e.g., 102b or 104b). The pair may form a complementary MOS circuit (CMOS). The amplifier's transconductors may be sized to provide the desired gain and noise performance for the particular application. The differential amplifier comprises the active portion of the circuit 100 and produces a differential output voltage between the output terminals (Outp, Outn). This output would then be passed on to the next stage of the receiver.

The differential amplifier may be biased in any suitable manner. In the embodiment depicted, p-mos transistors 106a and 108a and n-mos transistors 106b and 108b provide the biasing. A first bias voltage pbias is applied to the gates of the p-mos transistors 106a and 108a and a second bias voltage nbias is applied to the gates of the n-mos transistors 106b and 108b. The bias voltages pbias and nbias may be supplied by any suitable bias circuit (not shown). The biasing components effectively function as current sources to provide the desired current flow through the transconductors.

Circuit 100 utilizes inductive peaking as one equalization mechanism. In the embodiment depicted, inductors 110a and 110b are coupled between a node 112a that couples the drains of transistors 102a and 102b together and a node 112b that couples the drains of transistors 104a and 104b together. The output nodes (outp and outn) are loaded with these inductors 110a and 110b as well as capacitive loads 114a and 114b. The capacitive loads 114a and 114b may represent capacitive loads of elements of the circuit 100 or receiver (as opposed to discrete capacitors). For example, capacitive load 114a may represent the output capacitance of a first transconductor (e.g., transistors 102a and 102b) and the input capacitance of the next stage of the receiver (e.g., the loading stage input capacitance). Likewise, capacitive load 114b may represent the output capacitance of a second transconductor (e.g., transistors 104a and 104b) and the input capacitance of the next stage of the receiver. In one embodiment, the inductors 110a and 110b are symmetric (e.g., have the same inductance value).

In the embodiment depicted, a tunable resistance 116 is coupled between the inductors 110a and 110b. The tunable resistance 116 is also coupled to a common mode voltage 118. The tunable resistance 116 may be implemented in any suitable manner to provide an adjustable first resistance segment between the inductor 110a and the common mode voltage 118 and an adjustable second resistance segment between the inductor 110b and the common mode voltage 118. In some embodiments, the first resistance segment and the second resistance segment have the same amount of resistance. Thus, in order to properly bias the output stage, the resistance 116 may be biased at its midpoint (such that half of the resistance 116 is on each side of the midpoint) by the common mode voltage 118. In one embodiment, the tunable resistance 116 may comprise a network of resistive elements and switches that selectively couple the resistive elements to the paths between each inductor and the common mode voltage 116.

In one embodiment, the inductors 110a and 110b and the tunable resistance 116 may be replaced with two tunable resistors coupled between nodes 112a and 112b and an inductor placed between the two tunable resistors.

An inductor 110a, capacitance 114a, and resistance 116 form a resonant circuit (a similar resonant circuit may be formed by inductor 110b, capacitance 114b, and resistance 116). In the resonant circuit, the shunt inductor 110a resonates with the capacitance 114a, producing a complex pole pair. The inductance value of the inductor 110a may be selected to set this complex pole pair at or close to the Nyquist frequency of the signal (in some embodiments the inductance value may be fixed at the time of manufacturing, in other embodiments the inductance value may be tunable). The quality (Q) factor of the LC circuit formed by the inductor 110a and the capacitance 114a is dependent on the configured value of the resistance 116. Thus, the Q factor of the LC circuit may be adjusted by tuning the resistance 116, resulting in configurable peak gain adjustment. When the resistance 116 is raised, the Q factor drops and conversely when the resistance 116 is lowered the Q factor is raised. When the resistance 116 is high, the Q factor is low and the equalizer circuit 100 will have a soft resonance and will not amplify a signal at the resonance frequency (thus the peak gain at the resonance frequency decreases with increasing resistance 116). Conversely, when the resistance 116 is low, the Q factor is high and the equalizer circuity 100 will have a high resonance and will amplify a signal at the resonance frequency. In various embodiments, the magnitude of the frequency response of circuit 100 may increase linearly or non-linearly with frequency, as a function of the resistance 116.

In some differential amplifier implementations, the node 122a connected to the source of transistor 102a would be connected directly to the node 122b at the source of transistor 104a and the node 124a connected to the source of transistor 102b would be connected directly to the node 124b at the source of transistor 104b. However, in the embodiment depicted, a first source degeneration network 120a is coupled between nodes 122a and 122b and a second source degeneration network 120b is coupled between 124a and 124b. Each source degeneration network 120 includes an adjustable resistance 124 (e.g., 124a, 124b) and an adjustable capacitance 126 (e.g., 126a, 126b). The source degeneration networks may enable an additional degree of freedom on the shape of the slope of the transfer function of circuit 100 to better match the channel's transfer function's shape by introducing a zero/pole couple. The combination of the attenuation at low frequency provided by both load resistance (e.g., 118) and degeneration resistance (e.g., 124a and 124b) allows the circuit 100 to support large input voltage swings.

Figure 2:
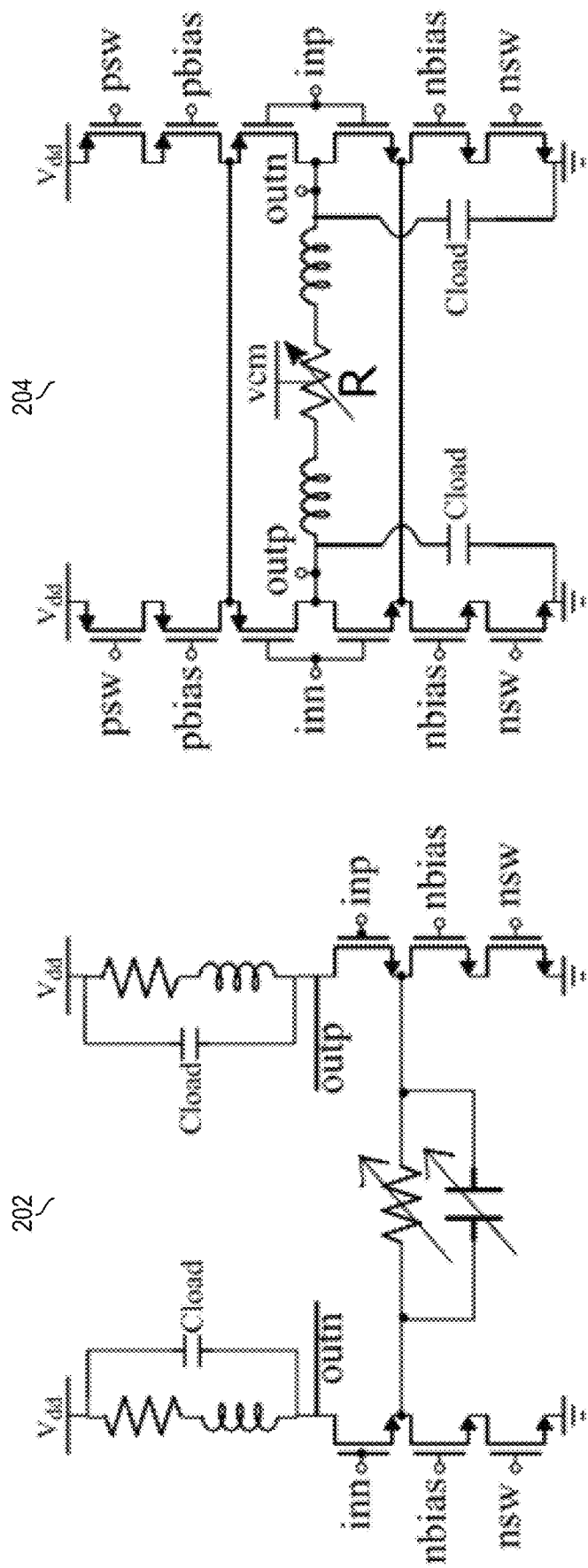
FIG. 2 illustrates a source-degeneration CTLE and a Q-shaping CTLE in accordance with certain embodiments.

FIG. 2 illustrates a source-degeneration CTLE 202 and a Q-shaping CTLE 204 in accordance with certain embodiments. In the source-degeneration CTLE 202 the frequency response of the CTLE may be controlled by changing its low-frequency response, thus influencing the slope of the frequency response but not the amount and frequency of high-frequency peaking. In various implementations, the slope of the source-degeneration CTLE frequency response can be modified by tuning its capacitor, with such tuning mainly affecting the mid-range frequencies. Varying the tunable resistor value may also allow for different levels of de-emphasis of low frequencies.

In the source-degeneration CTLE 202, when the slope or low frequency de-emphasis is changed, the frequency response peak is also changed, thus complicating matching for typical channels which have different slopes at different frequency ranges and different gain requirements at high-frequency as well as low frequency.

In the Q-Shaping CTLE 204, the peaking frequency is set by the resonant circuit L and C, while the peak height is determined by varying the resistor R which impacts the output resonance circuit Q-factor. As the resistor R is varied, both the gain in the peak frequency and the low frequency gain change simultaneously, causing the slope of the frequency response to remain practically constant. For channels requiring a large amount of peaking (such as long channels, channels with a dip around the Nyquist frequency, etc.), the Q-factor may be set very high, which may result in an excessive slope (e.g., 40 dB/decade) of the CTLE resonant circuit.

In various embodiments, desirable features from the source-degeneration CTLE 202 and the Q-shaping CTLE 204 are combined in a single stage of an equalization circuit (e.g., 100). Various embodiments may provide the ability to independently adjust the resonant frequency, the gain in the resonant frequency, the low frequency gain, and the frequency response slope at various frequencies. Consolidating such features into a single stage offers benefits beyond utilizing both types of equalizers together (e.g., in a cascaded fashion), such as one or more of lower circuit area consumption (due to less components), less loading (as one circuit would need to drive the next), less noise, and better linearity.

Figure 3:
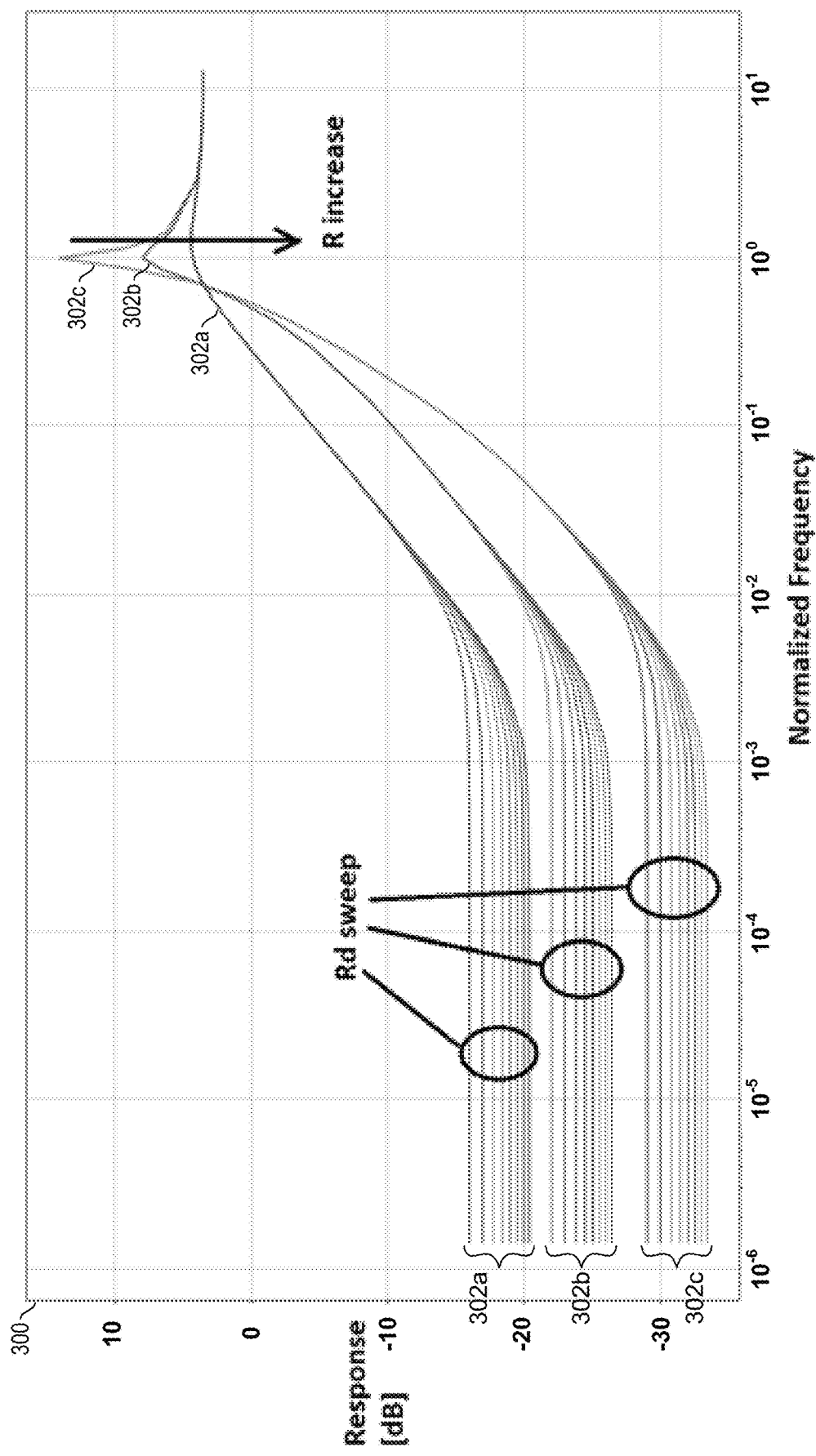
FIG. 3 illustrates a graph showing frequency responses of a hybrid CTLE circuit in accordance with certain embodiments.

FIG. 3 illustrates a graph 300 showing frequency responses of a hybrid CTLE circuit (e.g., 100) in accordance with certain embodiments. In the graph, the y-axis is the frequency response in decibels (dB) and the x-axis is the normalized frequency (where a normalized frequency value of 1 corresponds to the peak frequency). In graph 300, three sets of frequency responses are depicted. A first set 302a depicts frequency responses for a first value of R (e.g., 116) and for various values of Rd (e.g., 124a and 124b), a second set 302b depicts frequency responses for a second value of R and for the various values of Rd, and a third set 302c depicts frequency responses for a third value of R and for the various values of Rd. In this depiction, the first value of R (corresponding to set 302a) is the highest value, the second value of R (corresponding to set 302b) is the next highest value, and the third value of R (corresponding to set 302c)

is the lowest value. Each set 302 depicts the corresponding frequency responses when Cd (e.g., 126a and 126b) is held constant and Rd is swept.

As depicted, modifying the value of R controls the Q of the output resonant tank (e.g., the aforementioned LC circuit of circuit 100) and thus the gain at the resonance (peak) frequency (depicted as frequency $10^0$), which may be the Nyquist rate or close to the Nyquist rate. As R is increased, the Q-factor drops and thus the gain of the circuit 100 at the resonant frequency drops. Also as depicted, modifying the value of Rd controls the source degeneration mounts (e.g., 120a and 120b) which affects the low frequency deemphasis (thus the loss at each frequency response of a set 302 is different for the low frequencies). In the embodiment depicted, the low frequency range includes at least the range extending from a normalized frequency of $10^{-6}$ to $10^{-3}$. By manipulating both R and Rd, different levels of low-frequency de-emphasis may be achieved for desired levels of Nyquist-rate (or other resonance frequency) gain.

Figure 4:
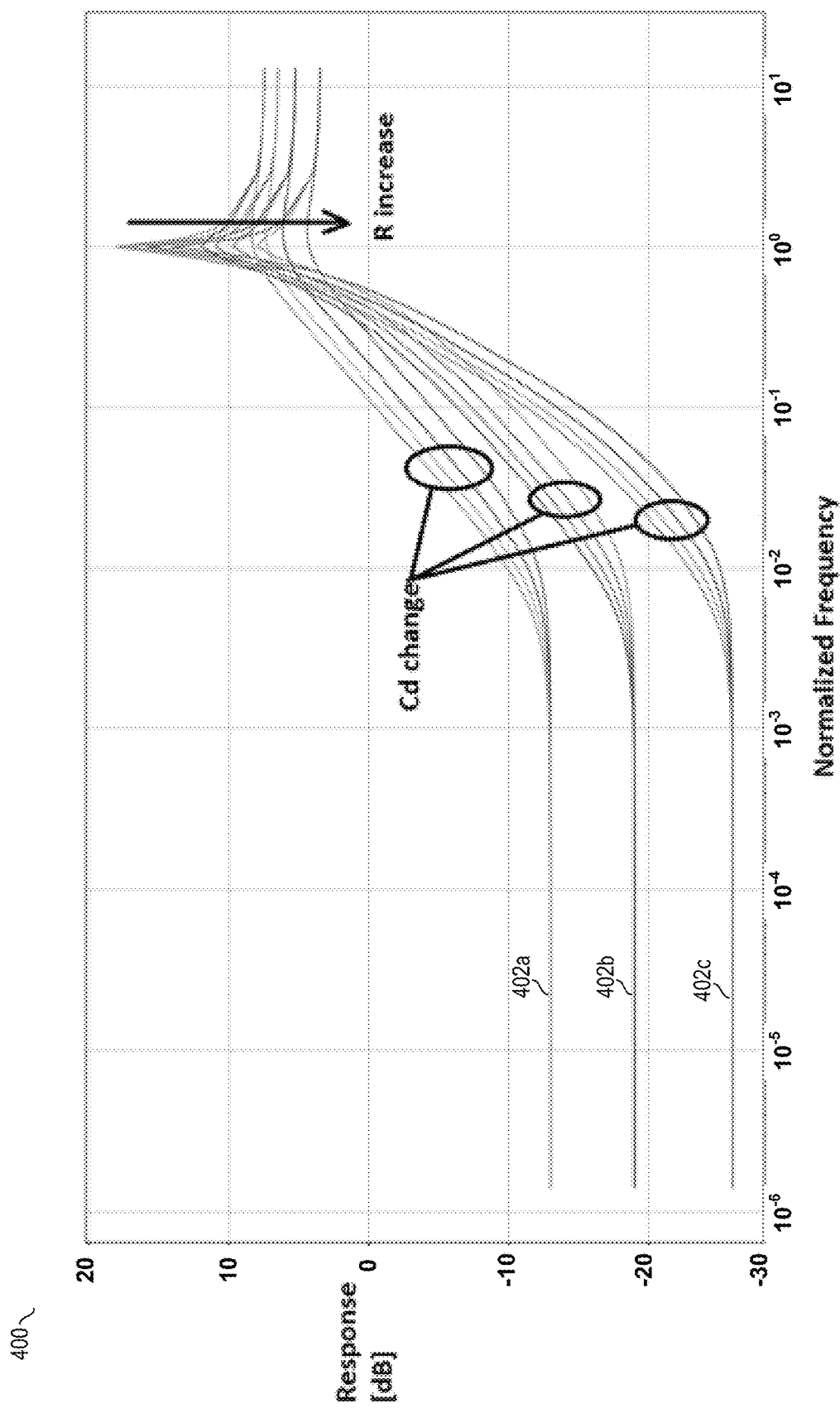
FIG. 4 illustrates a graph showing frequency responses of a hybrid CTLE circuit in accordance with certain embodiments.

FIG. 4 illustrates a graph 400 showing frequency responses of a hybrid CTLE circuit (e.g., 100) in accordance with certain embodiments. In the graph, the y-axis is the frequency response in dB and the x-axis is the normalized frequency. In graph 400, three sets of frequency responses are depicted. A first set 402a depicts frequency responses for a first value of R (e.g., 116) and for various values of Cd (e.g., 126a and 126b), a second set 402b depicts frequency responses for a second value of R and for the various values of Cd, and a third set 402c depicts frequency responses for a third value of R and for the various values of Cd. In this depiction, the first value of R (corresponding to set 402a) is the highest value, the second value of R (corresponding to set 402b) is the next highest value, and the third value of R (corresponding to set 402c) is the lowest value. Each set 402 depicts the corresponding frequency responses when Rd (e.g., 124a and 124b) is held constant.

As is apparent from the graph, modification of Cd effects the mid-range slope of the frequency response, without materially affecting the low range de-emphasis. In the embodiment depicted, the mid-range frequencies may include at least the normalized frequency of $10^{-2}$ to the normalized frequency of $5 \times 10^{-1}$ (although the mid-range may be defined differently in other instances). As in the previous graph 300, modification of R affects the gain at the resonant frequency.

By tuning both R and Rd (and/or Cd), one can achieve different levels of low-frequency de-emphasis and mid-range slope for desired levels of Nyquist-rate peaking. Thus, this architecture can be used for channels with different slopes or frequency responses and avoid under- or over-equalization. The tuning can control the frequency response of the low-frequency band, mid-frequency band, and the high-frequency band separately.

Figure 5:
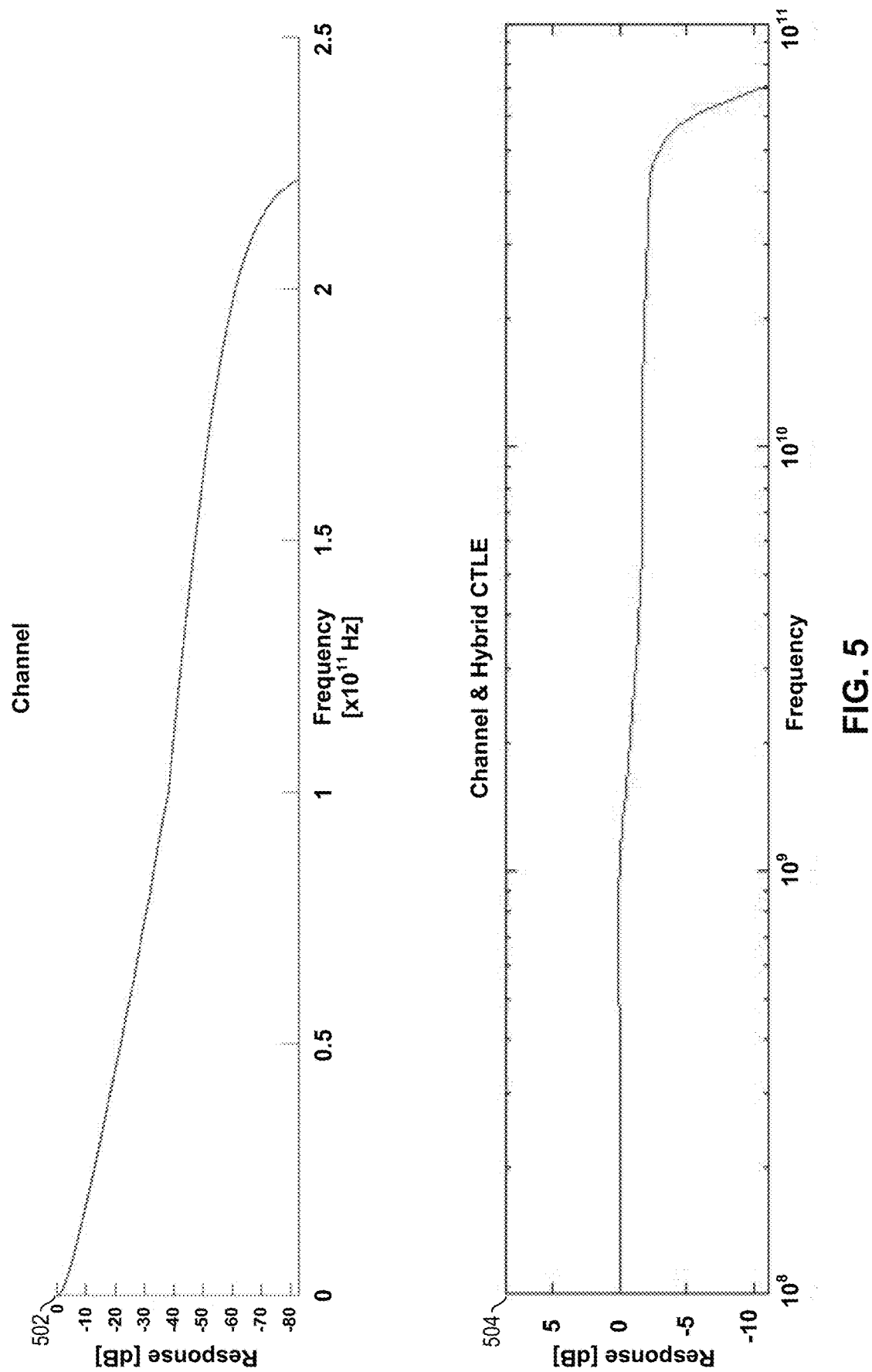
FIG. 5 illustrates a graph of a channel response and a graph of a combined channel and hybrid CTLE response in accordance with certain embodiments.

FIG. 5 illustrates a graph 502 of a channel response and a graph 504 of a combined channel and hybrid CTLE response in accordance with certain embodiments. Graph 502 depicts an example channel response without equalization. Graph 504 depicts an example combined response of the channel and a hybrid CTLE (e.g., 100). Graph 504 depicts the combined channel response for a subset of the frequencies depicted in graph 502. The resulting frequency response is very flat and does not include significant valleys or ripples in the low frequency, mid frequency, or high frequency space. The flatness of the curve results in less inter-symbol interference for the succeeding stages of the receiver to correct, resulting in a relaxation in the performance requirement of the receiver's analog to digital converter (ADC) and the consequential digital equalization as well as a reduction in power consumption by the receiver.

Figure 6:
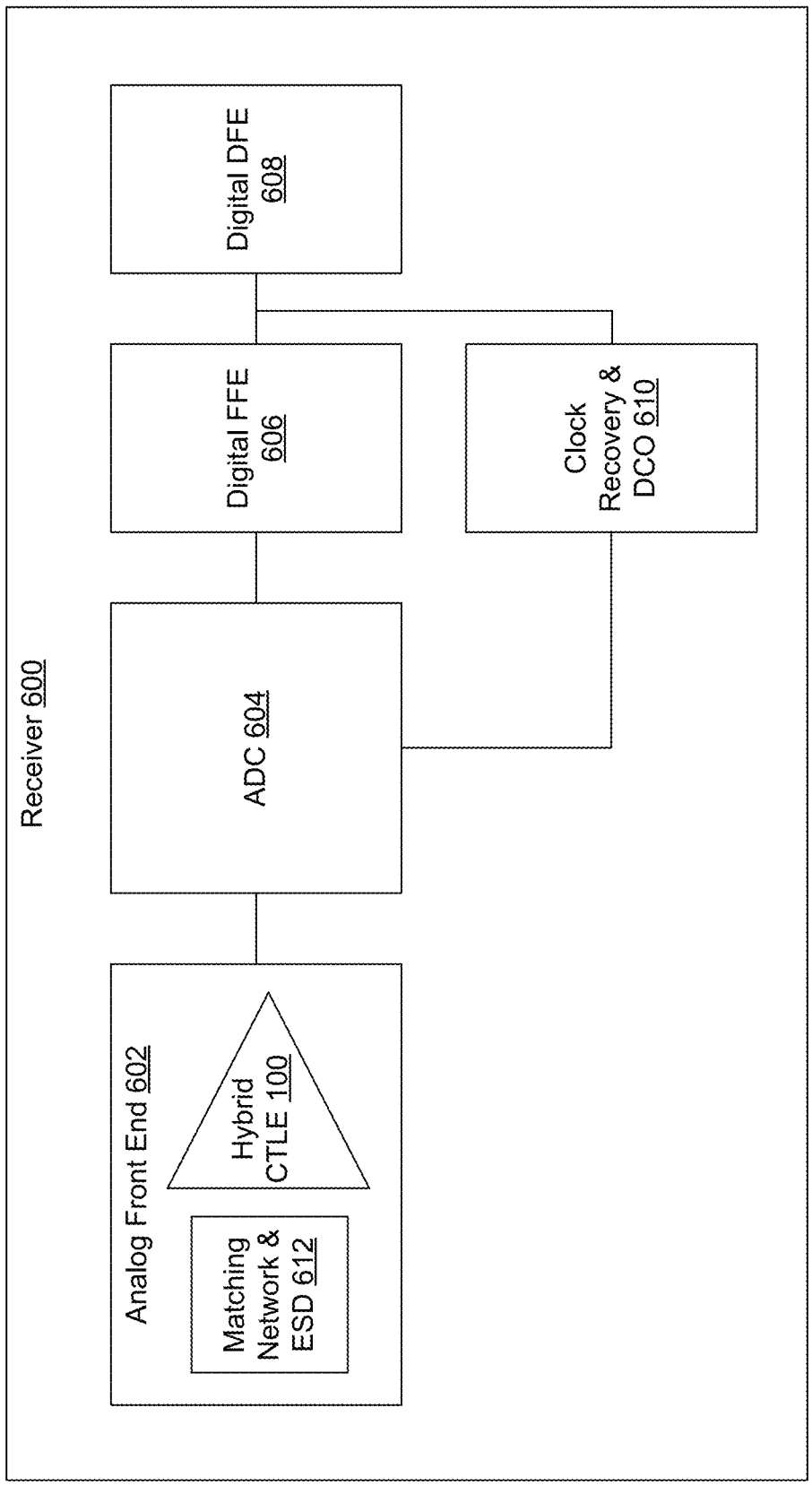
FIG. 6 illustrates a serializer/de-serializer (SERDES) receiver in accordance with certain embodiments.

FIG. 6 illustrates a SERDES receiver 600 in accordance with certain embodiments. Receiver 600 includes an analog front end 602, analog to digital converter (ADC) 604, digital feed-forward equalizer (FFE) 606, digital decision-feedback equalizer (DFE) 608, and clock recovery and digitally controlled oscillator (DCO) 610. Analog front end 602 includes matching network and electrostatic discharge (ESD) protection 612 and a hybrid CTLE 100. In operation, a signal is received by receiver 600 and equalized by hybrid CTLE 100. The output from the hybrid CTLE 100 is provided to the ADC 604 which converts the equalized analog signal into a digital signal. The digital signal is provided to digital FFE 606 and digital DFE 608 which perform equalization on the digital signal to treat residual inter-symbol interference (ISI) that is not equalized by the hybrid CTLE 100. Clock recovery may be provided by the clock recovery & DCO 610. The DCO output clock may be used to generate sampling phases for the ADC 604.

The hybrid CTLE 100 may utilize a small amount of power and chip area relative to digital equalization circuitry, such as the digital FFE 606 and digital DFE 608. In some embodiments, by improving the efficacy of the analog equalization stage (e.g., by utilizing hybrid CTLE 100), less ADC bits and less post-ADC digital equalization may be used, reducing the overall SERDES receiver 600 power dramatically, and enabling it to operate on harder channels with less power and silicon cost.

Although hybrid CTLE 100 is depicted as being used in a digital receiver utilizing analog to digital conversion, in various embodiments, the architectures described herein (or variants thereof) may be used in any suitable architectures. For example, hybrid CTLE 100 may be used in a receiver implementing analog DFE and slicers.

The following FIGS. depict systems and components that may be used in conjunction with the embodiments described above. For example, the systems or components depicted in the following FIGS. or components thereof may include receiver 600 (and/or hybrid CTLE 100). Thus, the components depicted therein (e.g., processor 710, interface 712, interface 714, graphics 740, accelerators 742, network interface 750, I/O interface 760, memory subsystem 720, peripheral interface 770, storage subsystem 780, racks 802, sleds 804, transceiver 1102, or any of the other components depicted in FIGS. 7-11 may incorporate the hybrid CTLE 100 or a variant thereof.

Figure 7:
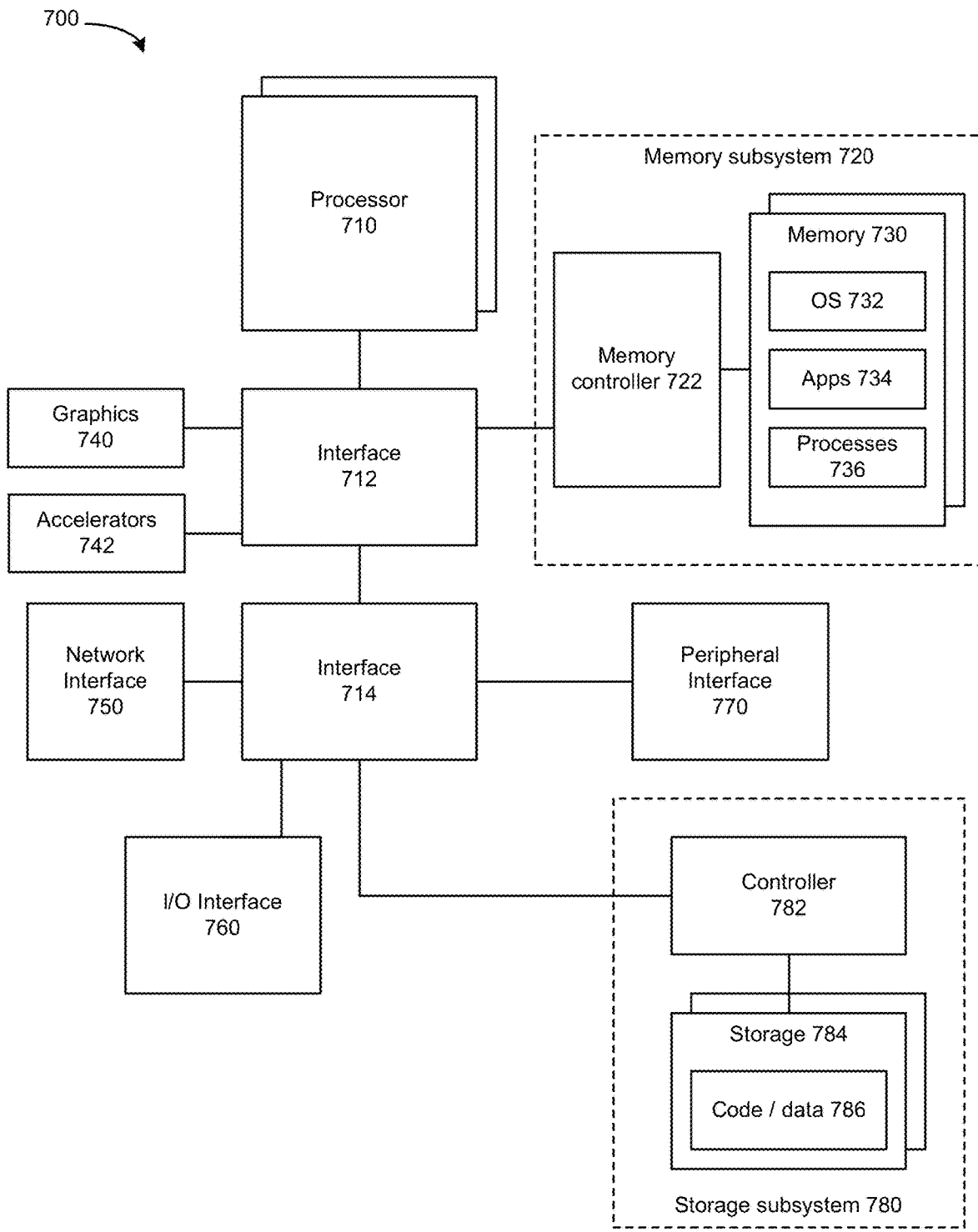
FIG. 7 illustrates an example computing system in accordance with certain embodiments.

FIG. 7 depicts an example computing system. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a non-volatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. In various embodiments, a hybrid CTLE circuit (e.g., 100 or variations thereof) as described herein may be used to equalize a signal sent via any suitable high speed interconnect such as those described above or other suitable interconnect. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 8:
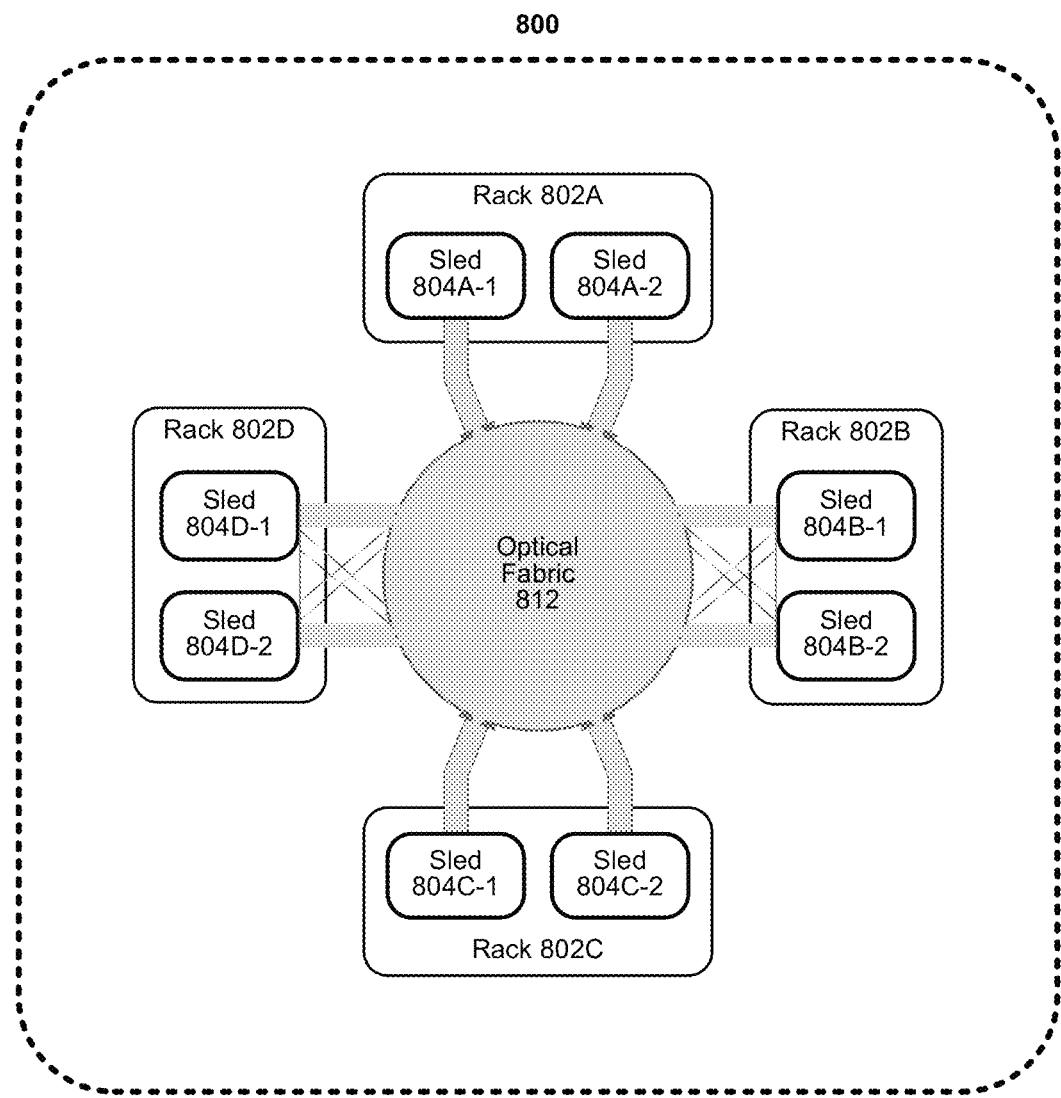
FIG. 8 illustrates an example data center in accordance with certain embodiments.

FIG. 8 depicts an example of a data center. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) each of the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide each sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example.

Figure 9:
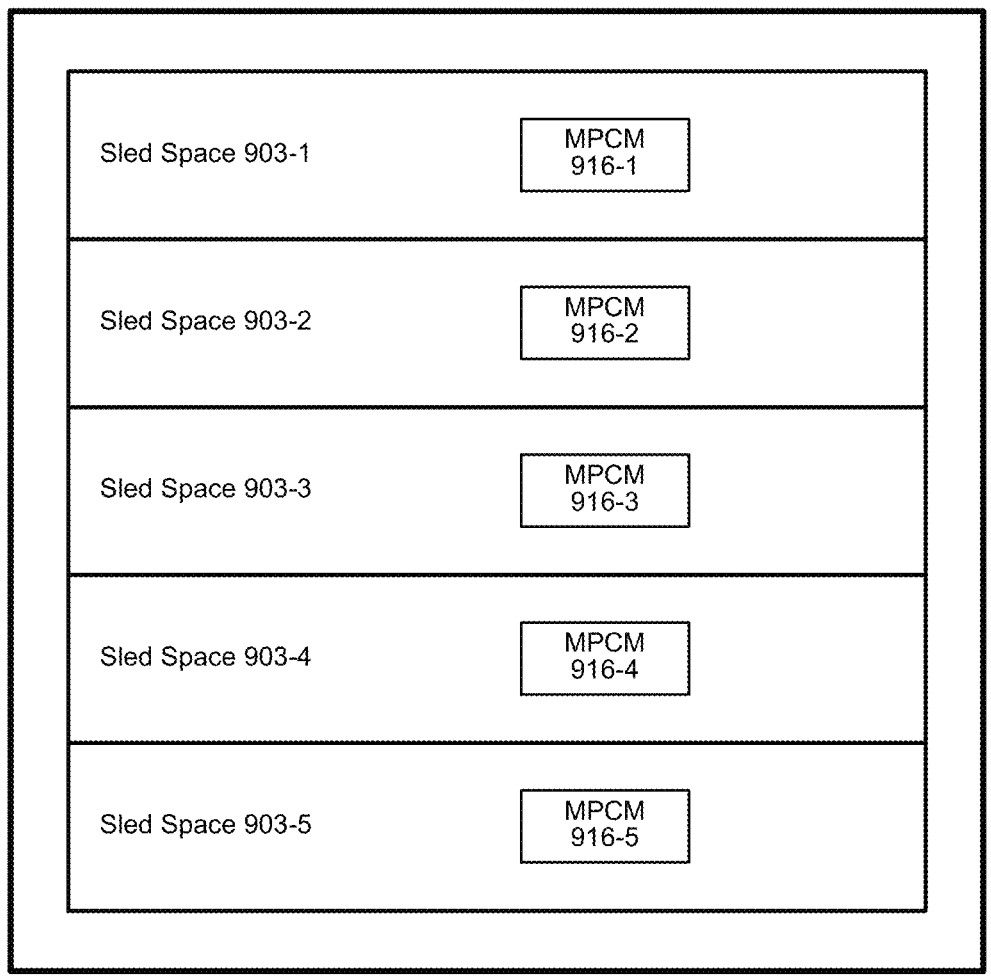
FIG. 9 illustrates an example rack architecture in accordance with certain embodiments.

FIG. 9 depicts a rack architecture such that a plurality of sled spaces can have sleds inserted. Sled spaces can be robotically-accessible via a rack access region 901. In the particular non-limiting example, rack architecture 900 features five sled spaces 903-1 to 903-5. Sled spaces 903-1 to 903-5 feature respective multi-purpose connector modules (MPCMs) 916-1 to 916-5.

Figure 10:
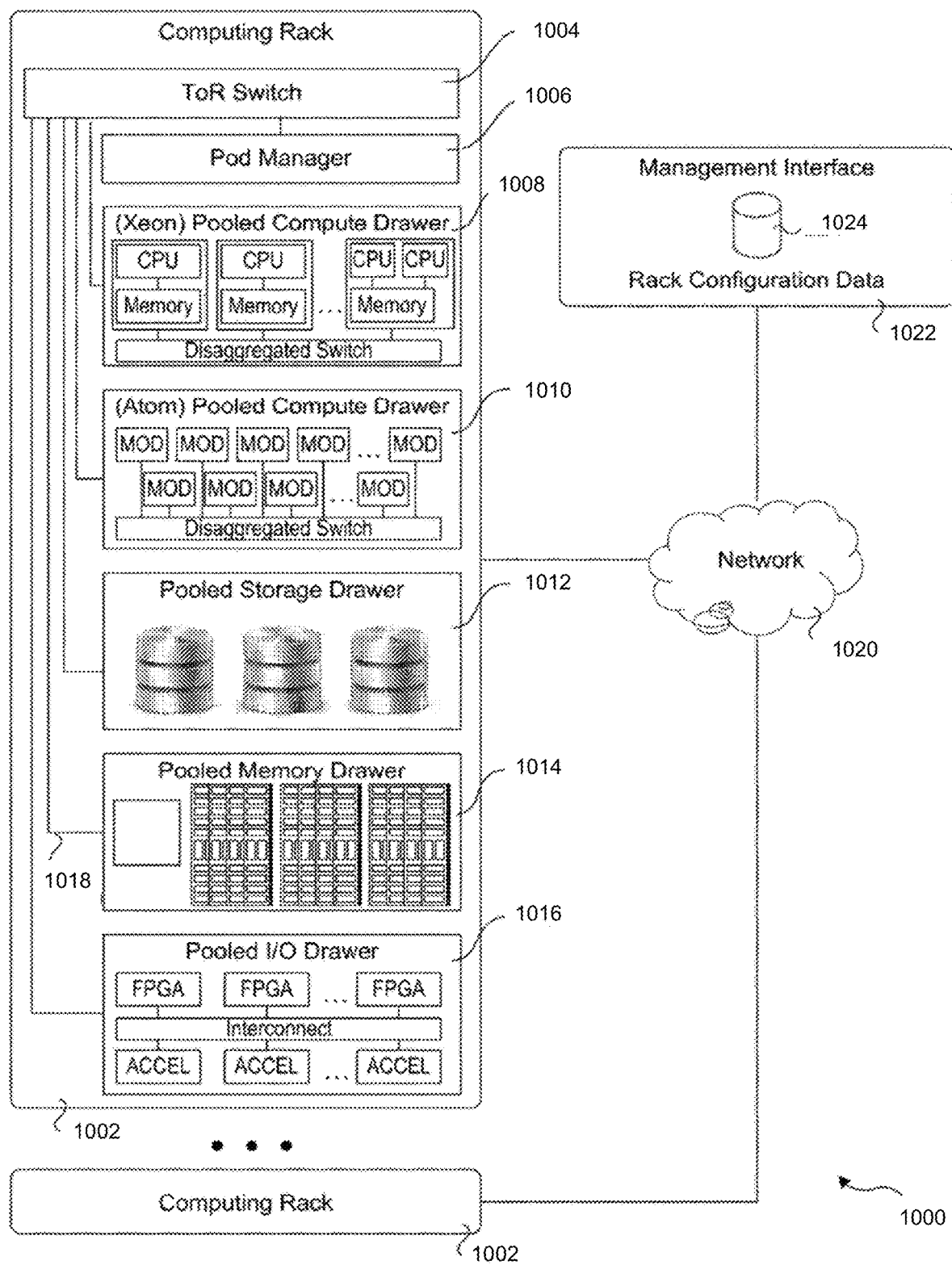
FIG. 10 illustrates an example computing environment in accordance with certain embodiments.

FIG. 10 depicts an environment 1000 includes multiple computing racks 1002, each including a Top of Rack (ToR) switch 1004, a pod manager 1006, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1008, and Intel® ATOM™ pooled compute drawer 1010, a pooled storage drawer 1012, a pooled memory drawer 1014, and a pooled I/O drawer 1016. Each of the pooled system drawers is connected to ToR switch 1004 via a high-speed link 1018, such as a 40 Gigabit/second (Gb/s) or 100 Gb/s Ethernet link or a 100+ Gb/s Silicon Photonics (SiPh) optical link. In one embodiment high-speed link 1018 comprises an 800 Gb/s SiPh optical link.

Multiple of the computing racks 1002 may be interconnected via their ToR switches 1004 (e.g., to a pod-level switch or data center switch), as illustrated by connections to a network 1020. In some embodiments, groups of computing racks 1002 are managed as separate pods via pod manager(s) 1006. In one embodiment, a single pod manager is used to manage all of the racks in the pod. Alternatively, distributed pod managers may be used for pod management operations.

Environment 1000 further includes a management interface 1022 that is used to manage various aspects of the environment. This includes managing rack configuration, with corresponding parameters stored as rack configuration data 1024.

Figure 11:
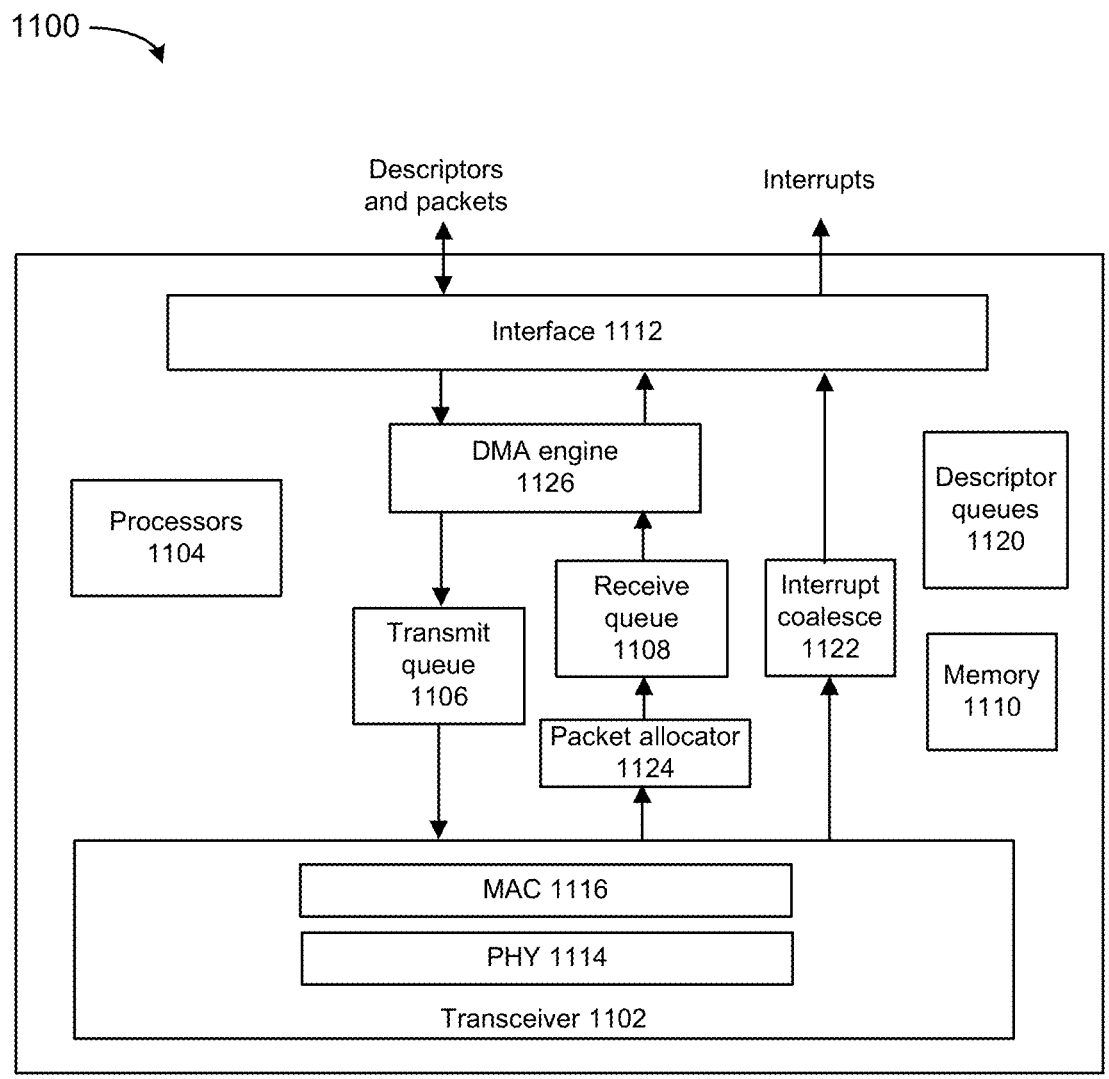
FIG. 11 illustrates an example network interface in accordance with certain embodiments.

FIG. 11 depicts a network interface that can use embodiments or be used by embodiments. Various processors of network interface 1100 can use techniques described herein to provision operating parameters of a core of processors 1104. For example, if a first core of processors 1104 performs packet processing and a second core of processor 1104 performs a power management process, the second core can modify operating parameters of the first core in accordance with embodiments described herein.

Network interface 1100 can include transceiver 1102, processors 1104, transmit queue 1106, receive queue 1108, memory 1110, and bus interface 1112, and DMA engine 1126. Transceiver 1102 can be capable of receiving and transmitting packets in conformance with the applicable protocols such as Ethernet as described in IEEE 802.3, although other protocols may be used. Transceiver 1102 can receive and transmit packets from and to a network via a network medium (not depicted). Transceiver 1102 can include physical layer (PHY) circuitry 1114 and media access control (MAC) circuitry 1116. PHY circuitry 1114 can include encoding and decoding circuitry (not shown) to encode and decode data packets according to applicable physical layer specifications or standards. MAC circuitry 1116 can be configured to assemble data to be transmitted into packets, that include destination and source addresses along with network control information and error detection hash values. MAC circuitry 1116 can be configured to process MAC headers of received packets by verifying data integrity, removing preambles and padding, and providing packet content for processing by higher layers.

Processors 1104 can be any a combination of a: processor, core, graphics processing unit (GPU), field programmable gate array (FPGA), application specific integrated circuit (ASIC), or other programmable hardware device that allow programming of network interface 1100. For example, processors 1104 can provide for allocation or deallocation of intermediate queues. For example, a "smart network interface" can provide packet processing capabilities in the network interface using processors 1104.

Packet allocator 1124 can provide distribution of received packets for processing by multiple CPUs or cores using timeslot allocation described herein or RSS. When packet allocator 1124 uses RSS, packet allocator 1124 can calculate a hash or make another determination based on contents of a received packet to determine which CPU or core is to process a packet.

Interrupt coalesce 1122 can perform interrupt moderation whereby network interface interrupt coalesce 1122 waits for multiple packets to arrive, or for a time-out to expire, before generating an interrupt to host system to process received packet(s). Receive Segment Coalescing (RSC) can be performed by network interface 1100 whereby portions of incoming packets are combined into segments of a packet. Network interface 1100 provides this coalesced packet to an application.

Direct memory access (DMA) engine 1126 can copy a packet header, packet payload, and/or descriptor directly from host memory to the network interface or vice versa, instead of copying the packet to an intermediate buffer at the host and then using another copy operation from the intermediate buffer to the destination buffer.

Memory 1110 can be any type of volatile or non-volatile memory device and can store any queue or instructions used to program network interface 1100. Transmit queue 1106 can include data or references to data for transmission by network interface. Receive queue 1108 can include data or references to data that was received by network interface from a network. Descriptor queues 1120 can include descriptors that reference data or packets in transmit queue 1106 or receive queue 1108. Bus interface 1112 can provide an interface with host device (not depicted). For example, bus interface 1112 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disk may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGS. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various systems or components described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 may comprise an apparatus comprising at least one medium to communicate a signal; and an analog equalization circuit to perform equalization on the signal, wherein the analog equalization circuit comprises independently tunable parameters including a peak frequency gain and a mid-range frequency response slope.

Example 2 may comprise the subject matter of Example 1, wherein the independently tunable parameters of the analog equalization circuit further include a low frequency de-emphasis amount.

Example 3 may comprise the subject matter of any one of Examples 1-2, wherein the analog equalization circuit comprises a differential amplifier, a resonant circuit, and a source-degeneration network in a single equalization stage.

Example 4 may comprise the subject matter of any one of Examples 1-3, wherein the analog equalization circuit comprises a first tunable resistance, wherein the first tunable resistance is to tune the peak frequency gain.

Example 5 may comprise the subject matter of Example 4, wherein the first tunable resistance comprises two equal resistance segments coupled between differential outputs of the analog equalization circuit, wherein the two resistance segments are respectively coupled to a common mode voltage.

Example 6 may comprise the subject matter of any one of Examples 4-5, wherein the analog equalization circuit comprises a second tunable resistance, wherein the second tunable resistance is to tune a low frequency deemphasis amount of the analog equalization circuit.

Example 7 may comprise the subject matter of any one of Examples 1-6, wherein the analog equalization circuit comprises a tunable capacitance, wherein the tunable capacitance is to tune the mid-range frequency response slope.

Example 8 may comprise the subject matter of any one of Examples 1-7, wherein the analog equalization circuit comprises a first inductor coupled between a first output and a first portion of a first tunable resistance; a second inductor coupled between a second output and a second portion of the first tunable resistance; a first tunable capacitor in parallel with a second tunable resistance; and a second tunable capacitor in parallel with a third tunable resistance.

Example 9 may comprise the subject matter of any one of Examples 1-8, wherein the analog equalization circuit comprises a first tunable capacitance in parallel with a first tunable resistance; and a second tunable capacitance in parallel with a second tunable resistance.

Example 10 may comprise the subject matter of any one of Examples 1-7 and 9, wherein the analog equalization circuit comprises an inductor coupled between a first tunable resistor and a second tunable resistor, wherein the inductor, first tunable resistor, and second tunable resistor are coupled between a first output and a second output of the analog equalization circuit.

Example 11 may comprise a system comprising a receiver front end comprising at least one medium to communicate a signal; and an analog equalization circuit to perform equalization on the signal, wherein the analog equalization circuit comprises independently tunable parameters including a peak frequency gain and a mid-range frequency response slope.

Example 12 may comprise the subject matter of Example 11, wherein the independently tunable parameters of the analog equalization circuit further include a low frequency de-emphasis amount.

Example 13 may comprise the subject matter of any one of Examples 11-12, wherein the analog equalization circuit comprises a differential amplifier, a resonant circuit, and a source-degeneration network in a single equalization stage.

Example 14 may comprise the subject matter of any one of Examples 11-13, wherein the analog equalization circuit comprises a first tunable resistance, wherein the first tunable resistance is to tune the peak frequency gain.

Example 15 may comprise the subject matter of Example 14, wherein the first tunable resistance comprises two equal resistance segments coupled between differential outputs of the analog equalization circuit, wherein the two resistance segments are respectively coupled to a common mode voltage.

Example 16 may comprise the subject matter of any one of Examples 14-15, wherein the analog equalization circuit comprises a second tunable resistance, wherein the second tunable resistance is to tune a low frequency deemphasis amount of the analog equalization circuit.

Example 17 may comprise the subject matter of any one of Examples 11-16, wherein the analog equalization circuit comprises a tunable capacitance, wherein the tunable capacitance is to tune the mid-range frequency response slope.

Example 18 may comprise the subject matter of any one of Examples 11-17, wherein the analog equalization circuit comprises a first inductor coupled between a first output and a first portion of a first tunable resistance; a second inductor coupled between a second output and a second portion of the first tunable resistance; a first tunable capacitor in parallel with a second tunable resistance; and a second tunable capacitor in parallel with a third tunable resistance.

Example 19 may comprise the subject matter of any one of Examples 11-18, wherein the analog equalization circuit comprises a first tunable capacitance in parallel with a first tunable resistance; and a second tunable capacitance in parallel with a second tunable resistance.

Example 20 may comprise the subject matter of any one of Examples 11-17 and 19, wherein the analog equalization circuit comprises an inductor coupled between a first tunable resistor and a second tunable resistor, wherein the inductor, first tunable resistor, and second tunable resistor are coupled between a first output and a second output of the analog equalization circuit.

Example 21 may comprise the subject matter of any one of Examples 11-20, further comprising an analog to digital converter (ADC) to convert an output of the analog equalization circuit to a digital signal.

Example 22 may comprise the subject matter of any one of Examples 11-21, further comprising a digital equalization circuit to perform equalization on an output of the ADC converter.

Example 23 may comprise the subject matter of any one of Examples 11-22, further comprising a processor unit comprising a central processing unit, graphics processing unit, accelerator, field programmable gate array, neural network processing unit, artificial intelligence processing unit, inference engine, data processing unit, or infrastructure processing unit.

Example 24 may comprise the subject matter of Example 23, further comprising at least one of a battery, display, or network interface controller communicatively coupled to the processor unit.

Example 25 may comprise a method comprising adjusting independently tunable parameters of an analog equalization circuit to perform equalization on a signal, wherein the independently tunable parameters include a peak frequency gain and a mid-range frequency response slope.

Example 26 may comprise the subject matter of Example 25, wherein the independently tunable parameters of the analog equalization circuit further include a low frequency de-emphasis amount.

Example 27 may comprise the subject matter of any one of Examples 25-26, further comprising setting a first tunable resistance to tune the peak frequency gain.

Example 28 may comprise the subject matter of Example 27, further comprising setting a second tunable resistance to tune a low frequency de-emphasis amount.

Example 29 may comprise the subject matter of any one of Examples 25-28, further comprising setting a tunable capacitance to tune the mid-range frequency response slope.

Example 30 may comprise the subject matter of any one of Examples 11-20, further comprising an analog decision-feedback equalizer.

What is claimed is:

1. An apparatus comprising:
   at least one medium to communicate a signal; and
   an analog equalization circuit to perform equalization on the signal, wherein the analog equalization circuit comprises in a single equalization stage:
      a resonant circuit comprising an inductor, a resistance, and a capacitance;
      a first source-degeneration network comprising a first tunable capacitance in parallel with a first tunable resistance; and
      a second source-degeneration network comprising a second tunable capacitance in parallel with a second tunable resistance.

2. The apparatus of claim 1, wherein the analog equalization circuit comprises independently tunable parameters including a peak frequency gain and a mid-range frequency response slope.

3. The apparatus of claim 2, wherein the independently tunable parameters of the analog equalization circuit further include a low frequency de-emphasis amount.

4. The apparatus of claim 1, wherein the resistance is to tune a peak frequency gain.

5. The apparatus of claim 4, wherein the resistance comprises two equal resistance segments coupled between differential outputs of the analog equalization circuit, wherein the two resistance segments are respectively coupled to a common mode voltage.

6. The apparatus of claim 4, wherein the second tunable resistance is to tune a low frequency deemphasis amount of the analog equalization circuit.

7. The apparatus of claim 1, wherein the first tunable capacitance is to tune a mid-range frequency response slope.

8. The apparatus of claim 1, wherein the inductor is a first inductor and the analog equalization circuit comprises:

the first inductor, the first inductor coupled between a first output and a first portion of the resistance; and a second inductor coupled between a second output and a second portion of the resistance.

9. The apparatus of claim 1, wherein the inductor is coupled between a first tunable resistor and a second tunable resistor, wherein the inductor, first tunable resistor, and second tunable resistor are coupled between a first output and a second output of the analog equalization circuit.

10. A system comprising:
a receiver front end comprising:
at least one medium to communicate a signal; and
an analog equalization circuit to perform equalization on the signal, wherein the analog equalization circuit comprises:
a tunable resistor in series with an inductor, the tunable resistor to tune a peak frequency gain; and
a tunable capacitor to tune a mid-range frequency response slope.

11. The system of claim 10, further comprising an analog to digital converter (ADC) to convert an output of the analog equalization circuit to a digital signal.

12. The system of claim 11, further comprising a digital equalization circuit to perform equalization on an output of the ADC.

13. The system of claim 10, further comprising an analog decision-feedback equalizer.

14. The system of claim 10, further comprising a processor unit comprising a central processing unit, graphics processing unit, accelerator, field programmable gate array, neural network processing unit, artificial intelligence processing unit, inference engine, data processing unit, or infrastructure processing unit.

15. The system of claim 14, further comprising at least one of a battery, display, or network interface controller communicatively coupled to the processor unit.

16. A method comprising:
adjusting tunable parameters of an analog equalization circuit to perform equalization on a signal, wherein the tunable parameters include a low frequency de-emphasis amount and a mid-range frequency response slope, wherein an adjustment of the low frequency de-emphasis amount does not change the mid-range frequency response slope, wherein the tunable parameters further include a peak frequency gain and the method comprises setting a first tunable resistance to tune the peak frequency gain.

17. The method of claim 16, further comprising setting a second tunable resistance to tune the low frequency de-emphasis amount.

18. The method of claim 16, further comprising setting a tunable capacitance to tune the mid-range frequency response slope.

* * * * *